April 27, 1926. 1,582,497
C. B. WATERS
FORMS OF ALTERNATING CURRENT ARC WELDING APPARATUS
Filed Feb. 4, 1924
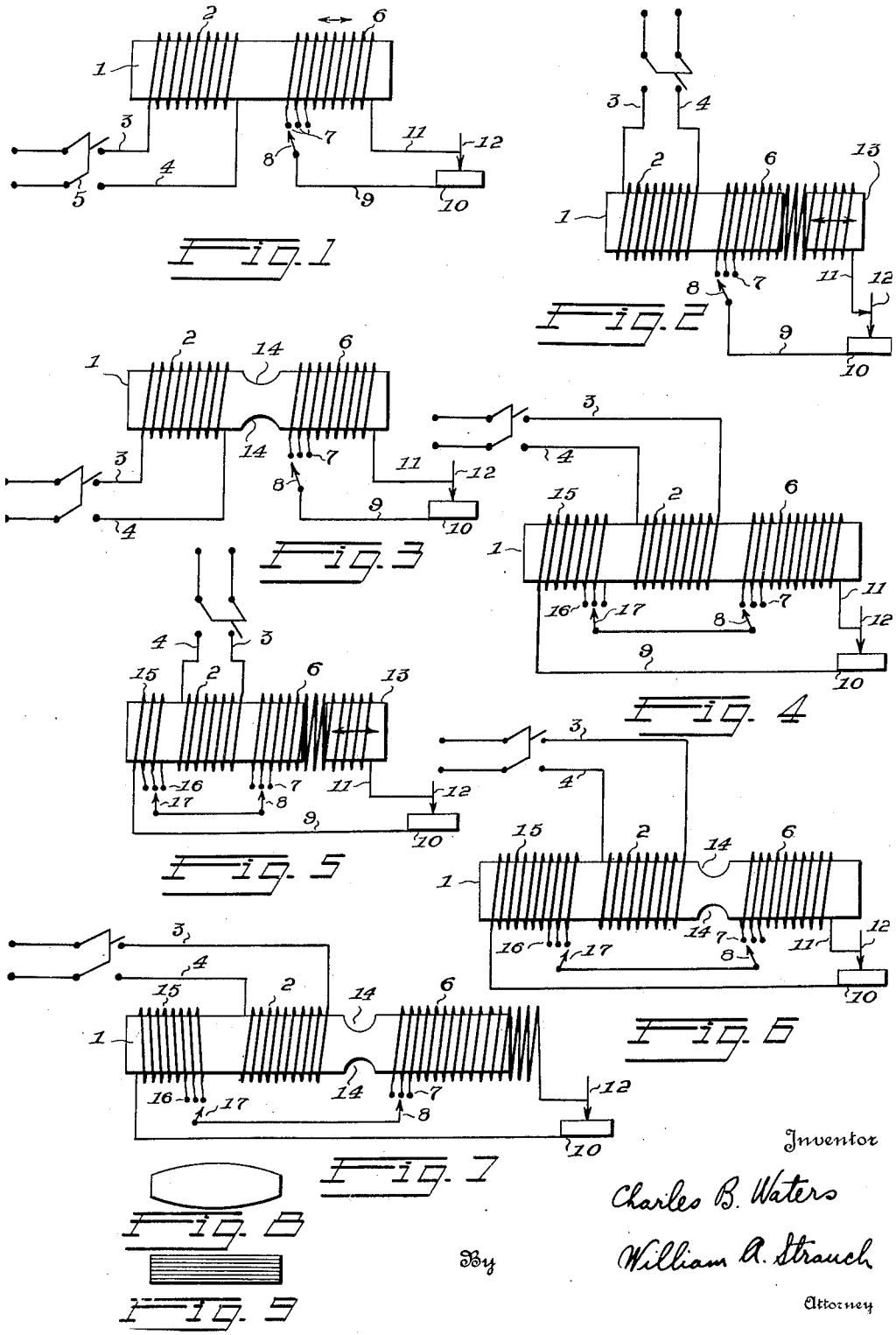

Patented Apr. 27, 1926.

1,582,497

UNITED STATES PATENT OFFICE.

CHARLES B. WATERS, OF MONTCLAIR, NEW JERSEY.

FORMS OF ALTERNATING-CURRENT ARC-WELDING APPARATUS.

Application filed February 4, 1924. Serial No. 690,490.

*To all whom it may concern:*

Be it known that I, CHARLES B. WATERS, a citizen of the United States, residing at Montclair, in the county of Essex and State of New Jersey, have invented certain new and Improved Forms of Alternating-Current Arc-Welding Apparatus, of which the following is a specification.

The present invention relates to new and improved forms of alternating current arc welding apparatus.

Arc welding transformers heretofore proposed have had the windings thereof disposed on completely closed magnetic cores. By experimentation and research I have discovered that is is possible to produce an efficient and satisfactory welding transformer arrangement with a straight open core arrangement, and that the secondary current supply may be regulated in a number of ways.

By the application of my invention or discovery it is possible to produce a low cost welding arrangement in which the windings may be produced in standard machine wound coils, enabling the adoption of quantity production methods and a corresponding reduction in the production, eliminating a great proportion of assembly work.

A further advantage of the present invention or discovery is that machines are adaptable to a wide range of welding conditions, and afford more flexible arrangements than have been heretofore possible. In certain forms hereinafter disclosed it is possible to completely suppress the secondary arc effect and produce a low voltage heavy preheating current in the work to be welded, or the arc effect may be merely partially suppressed and a partial heating effect simultaneously obtained. The method of operation by partially suppressing the arc effect and increasing the heating effect of the current flow in the work is particularly effective in welding certain types of work, for example, in filling up scores in cast cylinders and work of a like nature.

An object of the invention is to provide simplified and efficient arc welding arrangements in which the above advantages may be effectively attained.

A further object of the invention is the provision of arc welding arrangements in which new and improved principles of control, regulation, and structure are utilized.

Other objects of the invention will appear in the following disclosure of the details and operation of preferred embodiments of the invention of which—

Figures 1 to 7 inclusive represent in diagram different forms of open core transformers embodying invention.

Fig. 8 represents a plan view of a more or less parabolic form of core, and

Fig. 9 represents a side elevation of the core shown in Fig. 8.

Referring to Fig. 1, a core 1 has wound thereon a primary winding 2 which may be connected to a source of alternating current by leads 3 and 4 and a switch 5. A secondary winding 6 is provided which is connected by taps 7, switch arm 8 and lead 9 to a piece of work 10 to be welded; and by lead 11 to a welding electrode 12. Primary winding 2 is preferably secured in fixed relation with respect to core 1, while secondary winding 6 is preferably adjustable along core 1, to vary the distance from the primary winding 2. Suitable mechanical means are of course provided to effect the relative adjustment of the coils 2 and 6, but since such mechanical details are no part of the present invention, they are unnecessary to enable an understanding of the invention to be had, and may be provided by a skilled mechanic and no disclosure thereof is here necessary.

The purpose of the relative adjustment of coils 2 and 6 is to vary the degree of transformer effect and to vary the magnetic leakage between the primary and the secondary coil. It will therefore be clear that coil 2 may be movable and coil 6 relatively fixed, or both coil 2 and coil 6 may be relatively movable with respect to the core, without departing from the principle of the invention.

It is found in operation that the secondary current and voltage may be regulated by adjusting the relative position of coil 6 with respect to coil 2, so that a stable arc may be attained between electrode 12 and work 10. A wide range in the relative numbers of turns in the primary and secondary windings may be chosen, and the machine is operative for arc welding under widely differing conditions. Regulation of secondary current and voltage may also be attained by reducing the number of secondary turns by means of taps 7 and switch 8. In the disclosure the switch and taps are shown connected to the end of coil 6 closest to primary winding 2, as the flux density is here greatest and a greater variation in effect is obtained in proportion to the number of turns cut out of the circuit, than if the switch were placed in lead 11.

The great flexibility of this arrangement and stability of welding conditions attained are due to the fact that by shifting the relative position of the coils, as the windings are separated the induced voltage in the secondary decreases and the self inductance and leakage reactance at the same time are increased. The leakage reactance and inductive effect may be regulated in this manner to prevent excessive currents being drawn from the line on short circuit, and the open circuit voltage of the secondary together with the inductance in the secondary circuit may be regulated with great accuracy to meet any desired arc conditions. The arc may be partially or completely suppressed for preheating by reducing the number of secondary turns and the heating effect increased, or the secondary may be positioned to give a limited arc and heating effect for filling up of cylinder scores and like operations.

In Fig. 2 a modified form is shown in which coils 2 and 6 are relatively fixed with respect to the core 1, and a movable magnetic core 13 is provided to vary the transformer effect and the inductance of secondary circuit. Parts similar in function and structure to those above set forth have been given the same reference characters as in the description of Fig. 1, and the description thereof will not be here repeated. The regulation of secondary circuit and arc conditions is here effected by adjusting core 13 in the end of coil 6, and by adjustment of switch 8.

In Fig. 3 a form is shown in which coils 2 and 6 are relatively fixed, and a large percentage of flux leakage is induced between the coils by reducing the section of core 1. This form is designed for welding work of predetermined character, and the regulation is obtained by the reduction in core section, and adjustment of switch 8.

In Fig. 4 the form shown in Fig. 1 is modified by the addition of an auxiliary secondary coil 15 which is applied in closely associated relation with primary coil 2, and is connected in series with coil 6 in a manner so that the voltages induced therein are added to the voltages induced in coil 6. Taps 16 and a switch 17 may be provided to vary the number of effective turns in auxiliary winding 15. Winding 15 is preferably secured in fixed relation with respect to core 1 and coil 2, but may be adjustable with respect thereto if so desired. The addition of auxiliary coil 15 is found to be economical in amount of copper required, and by proper adjustment of switches 8 and 17, or coil 6 or both, a more stable arc may be produced under certain varying conditions.

In Fig. 5 the form shown in Fig. 2 is modified by the addition of auxiliary secondary coil 15, taps 16 and switch 17 in the manner and for the same purposes as set forth in describing Fig. 4. The voltages induced in coils 6 and 15, add to each other, and movable core 13 is utilized to regulate the secondary conditions in the same manner as in Fig. 2.

In Fig. 6, the form shown in Fig. 4 is modified by reducing the section of core 1, as shown at 14, and coil 6 is secured in fixed relation with respect to core 1 and coil 2. As in the form shown in Fig. 3, this reduction in core section increases the flux leakage between primary coil 2 and secondary core 1. If desired the windings may be so designed as to produce a stable arc in the secondary for a fixed range of welding conditions, and all adjustments may be eliminated. Or if desired, coil 6 may be made adjustable along core 1 for a wider operating range, in the manner hereinbefore described.

In Fig. 7 a modification of the form disclosed in Fig. 6 is shown. In this form the voltages in coils 15 and 6 are opposed to each other, and a portion of coil 6 extends beyond core 1. Coil 6 may be adjustable along core 1 for purposes of regulation if desired. It has been found that the portion of coil 6 extending beyond core 1 acts as a pure inductance, while the portion on core 1 acts as a transformer, opposing the transformer effect of coil 15. The resultant induced voltage and secondary inductance can be closely regulated by shifting core 6 toward or away from coil 2 to suit particular arc conditions, and an effective welding arrangement is produced.

It will be apparent that the use of a single core upon which the windings are placed produces an inexpensive easily regulatable, and effective welding transformer, with advantages impossible to obtain in the usual closed magnetic circuit core types. Besides the advantages above set forth, a machine adapted for quantity production and rapid assembly is produced.

It is found that the core may be shaped in more or less parabolic form, as shown in Figures 8 and 9, in order that uniform core flux densities are attained, there being less flux threading the ends of the cores than thread the portion under the primary. The exact shapes giving satisfactory results with a minimum of material in the core may be calculated, but are preferably and more easily determined by experiment for each type of machine. These shapes are so made as to give uniform heating along the core and will, of course, vary for each type and size of machine.

I have discovered that the best condition for metallic arc welding with my improved forms of apparatus are attained when the parts are so proportioned and arranged with relation to each other that twelve to thirty volts are induced across a welding arc, and fifty to one hundred twenty-five volts are induced across the welding terminal on open circuit. The best conditions for any particular class of work are, however, readily determined in practice and easily attained due to the flexibility and adjustability of the various forms of the invention hereinbefore disclosed and it will be understood that the invention is not to be limited to working within the voltage ranges set forth.

Having described preferred embodiments of my invention, what is desired to be secured in Letters Patent and claimed as new is:

1. An arc welding transformer comprising an open magnetic core; a primary winding on said core; a secondary winding on said core so disposed with relation to said primary winding as to induce a substantial flux leakage between said primary winding and said secondary winding during welding operations; said windings being so proportioned and arranged with relation to each other that 12 to 30 volts are induced across a welding arc and 50 to 125 volts are induced across the welding secondary terminals on open circuit.

2. The combination as set forth in claim 1 in which said secondary winding is movable on said core.

3. An arc welding transformer comprising an open magnetic core; a primary winding on said core; a secondary winding on said core so disposed with relation to said primary winding as to induce substantial flux leakage between said primary and said secondary windings during welding operations; and an auxiliary secondary winding closely associated with said primary winding and connected in series with said first mentioned secondary winding during welding operations.

4. The combination as set forth in claim 3 in which said first mentioned secondary winding is movable with relation to said core.

5. An arc welding transformer comprising an open magnetic core; a primary winding on said core; a secondary winding on said core so disposed with relation to said primary winding as to induce substantial flux leakage between said primary winding and said secondary windings during welding operations; and an auxiliary secondary winding and connected in series with said first mentioned secondary winding during welding operations; said secondary windings being so proportioned with relation to said primary winding that 12 to 30 volts are induced across a welding arc and 50 to 125 volts are induced across the welding secondary terminals on open circuit.

6. An arc welding transformer comprising a straight open magnetic core; a primary winding on said core; and a secondary winding comprising a main coil on said core closely associated with said primary winding and an auxiliary coil on said core so disposed with relation to said primary winding that a substantial flux leakage is induced between said auxiliary coil and said primary winding during welding operations.

In testimony whereof, I affix my signature.

CHARLES B. WATERS.